Sept. 26, 1944.　　G. A. OVERSTROM　　2,358,876
BALANCED RECIPROCATING CONVEYING STRUCTURE
Filed April 23, 1942　　4 Sheets-Sheet 1

INVENTOR.
GUSTAVE A. OVERSTROM,
BY
ATTORNEY.

Sept. 26, 1944.    G. A. OVERSTROM    2,358,876
BALANCED RECIPROCATING CONVEYING STRUCTURE
Filed April 23, 1942    4 Sheets-Sheet 2
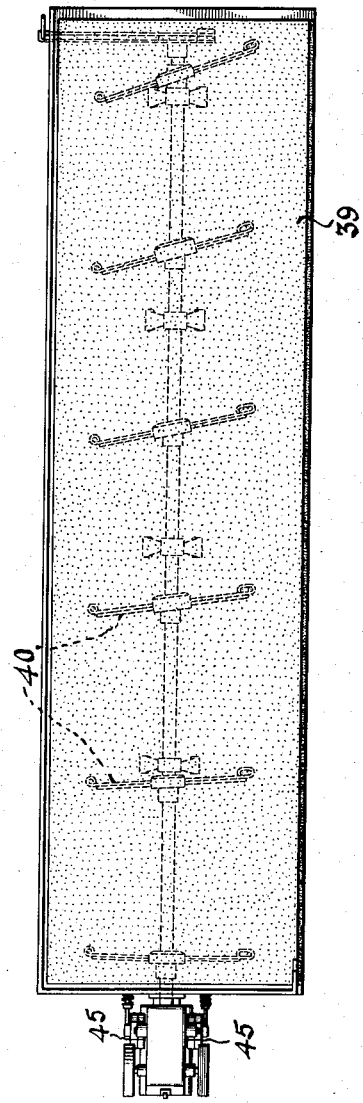
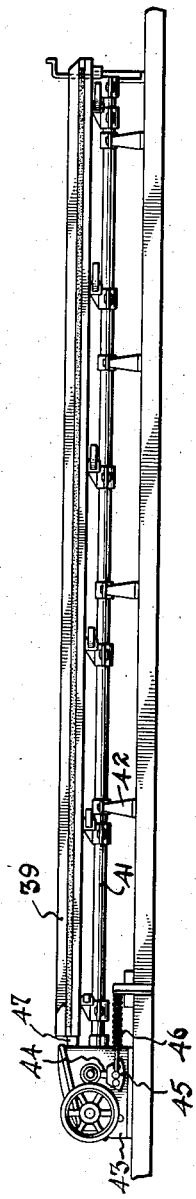
INVENTOR.
GUSTAVE A. OVERSTROM,
BY
ATTORNEYS.

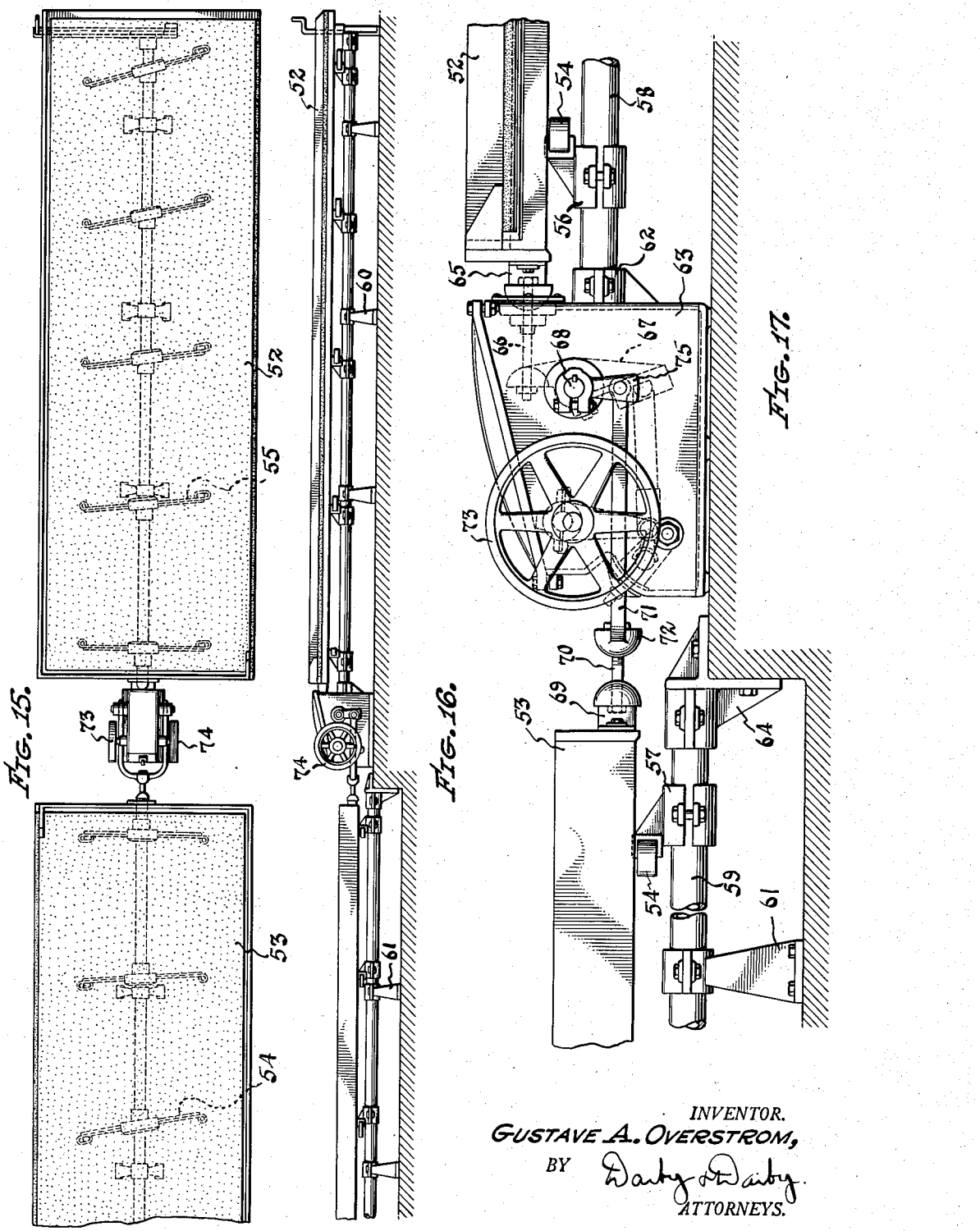

Patented Sept. 26, 1944

2,358,876

UNITED STATES PATENT OFFICE 2,358,876

BALANCED RECIPROCATING CONVEYING STRUCTURE

Gustave A. Overstrom, Eagle Rock, Calif.

Application April 23, 1942, Serial No. 440,209

15 Claims. (Cl. 198—220)

This invention relates to improvements in balanced reciprocating conveying structures, particularly of a type adapted for use in concentrating tables, screens and reciprocating conveyors.

This invention is particularly concerned with improvements in the manner of effecting a running balance in reciprocating conveying machinery, in which undesirable vibration cannot be transmitted to the building in which the machinery is housed.

It has been found from practical experience in the operation of reciprocating conveying machinery, for example, concentrating tables, that when many of these tables are placed in the second story of a mill a very considerable shake to the building results from the running of these machines. This becomes particularly true when several of the machines come into synchronism. Machinery of this type in use is, of necessity, built in rather small units because they have never been in balance; but by means of the invention described herein, machines of very large size and capacity can be built running in balance, thereby eliminating multiplicity of parts, attendance and shock to the mill structure.

Heretofore, of necessity, concentrating tables have been built in relatively small sizes, and consequently of relatively small capacity. The applicant has found that by utilizing the invention described herein he has been able to build concentrating tables of very large sizes; that is, concentrating tables 8' wide by 30' long. These large tables have, as a consequence of their very great size, a greater capacity per table than the art has heretofore been able to realize. The capacity of these large size tables is three to four times that of recognized standard makes of tables; and it has been found that mill costs can be considerably decreased for a given tonnage to be concentrated for the reason that the floor space occupied by the large tables is very much less than would be occupied by a greater number of small tables for an equivalent capacity.

It has been found in actual operation of very large concentrating tables that much more satisfactory results were realized when the moving weight bodies balanced each other against a separate spring resistance for each moving body.

It was also found in the operation of large concentrators, balanced for reciprocatory motion as disclosed in this invention, that if spring pressure great enough to take up all lost motion in the moving parts of the head motion to prevent knocking was applied to only the moving deck structure, too great a strain was put upon the deck members and associated parts. A great improvement in balance and freedom from lost motion results in balancing the moving deck against a moving counterweight and providing independent spring resistance for each weight to move against.

The general object of the invention is the provision of means to balance reciprocating conveying structures both as to mass and spring resistance.

Another object of the invention is the provision of counterbalancing means operatively connected to the head motion mechanism in reciprocating conveying structures.

Another object of the invention is to provide reciprocating conveying structures driven from a common crank shaft, conveying material in opposite directions.

Another object of the invention is the provision of means to balance reciprocating conveying structures driven from a common crank shaft with differential motion.

Another object of the invention is to provide means in a vibratory structure to counterbalance a moving weight and provide spring resistance to oppose the weight and the counterbalance thereto.

Another object of the invention is to provide separate spring means to oppose each moving weight body in a balanced reciprocatory structure.

Another object of the invention is to provide, in a reciprocatory structure, a common rock shaft to move weights in opposite directions to counterbalance each other against separate spring resistances for each moving body.

This invention resides substantially in the construction, arrangement and relative location of parts, all as will be described in full detail below.

In the accompanying drawings the same numerals have been used throughout to indicate the same or similar parts.

Figure 10 is a plan view of a concentrating table employing the invention.

Figure 11 is a side elevational view of Figure 10, illustrating the invention. It will be understood that both Figures 10 and 11 are more or less diagrammatic.

Figure 15 is a plan view of two concentrating tables running in balance and driven in opposite directions with differential motion from a common source.

Figure 16 is an elevation of Figure 15 showing the balanced construction of concentrating tables driven in opposite directions from a common means.

Figure 17 is an enlarged detail of Figure 16, parts broken away.

*Description of the mechanism applied to the various figures*

Figure 1:
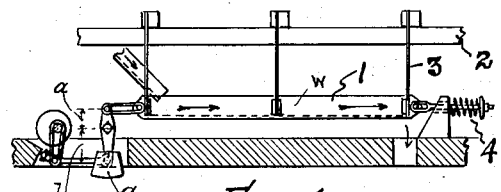
Figure 1 is a diagrammatic illustration of the side elevation of a conveyor employing the invention.

Referring to Figure 1, this figure particularly illustrates a conveying box 1, supported from any suitable beams 2 by legs 3. It will be noticed that the legs here are vertical and, of necessity, material will not travel sufficiently well in the direction shown by the arrows unless the conveying motion is differential; that is, a harmonic motion is not suitable to the conveying of material in a machine supported as illustrated in Figure 1. The conveying must be accomplished by means of the differential motion mechanism shown in subsequent figures herein and disclosed in full detail in my copending application Serial No. 439,312, filed April 17, 1942.

By means of drawing up on spring 4, the open joints illustrated in this mechanism are kept in working contact, and no lost motion occurs. The weight C is made of a sufficient amount so that it will counterbalance the weight of the box and the load, $a$ and $b$ being the lever lengths of the respective moving weights.

Figure 2:
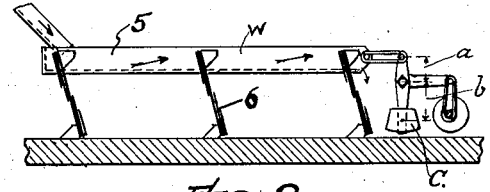
Figure 2 is a diagrammatic illustration of the side elevation of a screen box employing the invention.

Figure 2 illustrates a screen box 5 supported on inclined spring legs 6. It should be noticed here that the inclined legs themselves give the conveying motion that moves the material along the box, and in a structure of this type conveying by differential motion is not necessary, although advantageous. Screens of the type illustrated in Figure 2, when not in running balance, cause very great shocks to the foundation. By means of counterbalancing the weight W of the box and the load against the weight C, a smooth running machine results. It should be noticed in Figure 2 that the spring legs 6 are so arranged that the mechanism pulling against these springs keeps the joints tight, and the distances $a$ and $b$ on the pivoted lever are so proportioned that the weight W and the weight C counterbalance each other when the screen is in operation.

Figure 3:
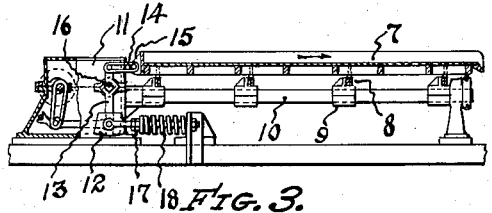
Figure 3 is a diagrammatic illustration of the side elevation of a concentrating table employing the invention, parts broken away.

In Figure 3 the deck of a concentrating table 7 is supported on bow springs 8, which are in turn clamped in a bracket 9. The bracket 9 is clamped to a pipe 10 and the table deck 7 conveys material in the direction shown by the arrow. The head motion housing 11, with parts broken away, illustrates a differential motion mechanism, and for the sake of clarity the joints have all been shown as open joints. The weight 12 is carried by arm 13. To the upper end of this arm is fastened an open link 14 attached to the bracket 15 of the table deck. This arm 13 is firmly and rigidly attached to a rock shaft 16 and the rock shaft is actuated by the differential motion mechanism.

Figure 13:
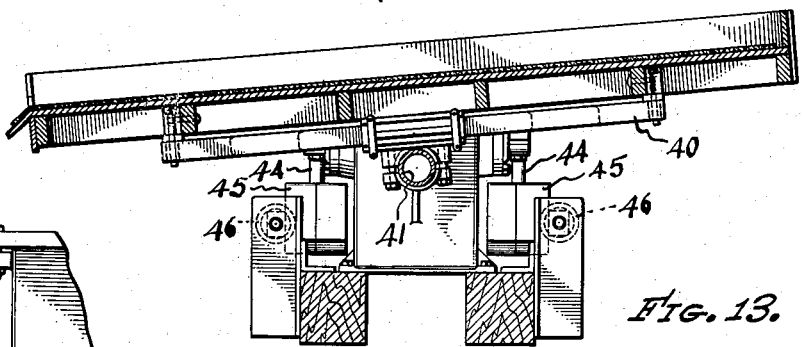
Figure 13 is a vertical section taken along the line 13—13 of Figure 12.
Figure 14:
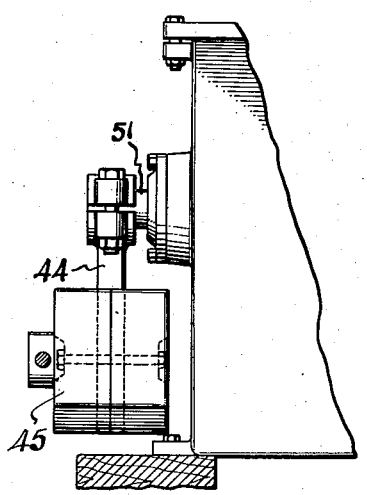
Figure 14 is a sectional view taken along the line 14—14 of Figure 12, parts broken away, showing the counterweight and swinging arm.

All lost motion in the open joints of the differential motion mechanism is eliminated by means of tightening on the nuts 17 causing the spring shown to press to the left in Figure 13. The bow springs upon which the table deck 7 rests are so arranged in tension as to keep the link joining the table deck to the head motion tight at all times while the spring 18 illustrated keeps all lost motion out of the internal joints of the mechanism.

Figure 4:
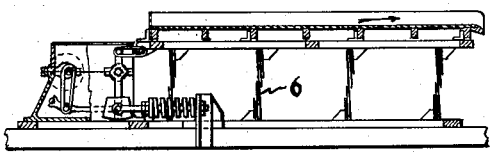
Figure 4 is a diagrammatic illustration of the side elevation of a concentrating table of a different type than shown in Figure 3, parts broken away.

In Figure 4 there is illustrated the same type of mechanism to actuate a concentrating table deck that there is in Figure 3; the only difference being in supporting the table deck by means of spring legs. The principles utilized in the illustration of Figure 4 are identical with those of Figure 3.

Figure 5:
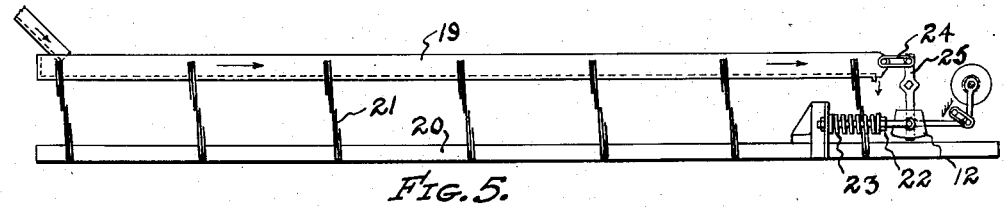
Figure 5 is a diagrammatic illustration of the side elevation of a conveyor employing the invention.

Figure 5 is a diagrammatic illustration of the invention applied to a reciprocating conveyor. The conveyor box 19 is supported from a beam 20 by spring legs 21. By means of tightening on the nut 22 coiled spring 23 presses to the right, holding the toggle joint mechanism of the differential head motion tight. The leaf spring legs exert tension throughout the box thereby taking up all lost motion in the link 24 which connects the box to the lever arm 25. The moving weight of the box is counterbalanced by the moving weight attached to the rocker arm. The legs themselves are set at a conveying angle. Attention is drawn to the fact that in Figure 2 the spring legs are set at a screening angle which also conveys; whereas in Figure 5 the legs are set at a conveying angle, and the material moves along the box 19 because of the differential motion imparted to that box, plus the conveying action due to inclination of legs 2; this combination gives very rapid conveying action.

Figure 6:
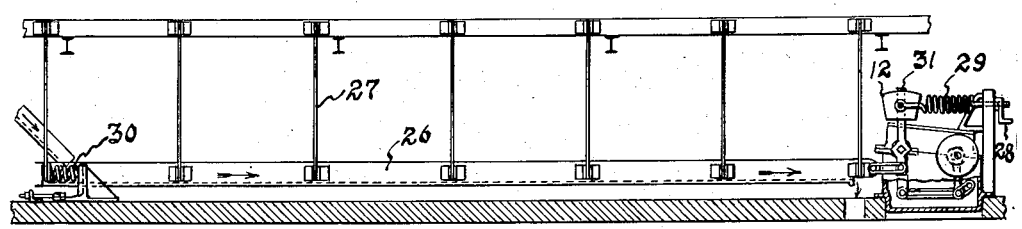
Figure 6 is a diagrammatic illustration of the side elevation of a conveyor, parts broken away.

Figure 6 is a diagrammatic illustration of a side elevation, parts broken away, of a long conveyor 26 supported from hanging legs 27 for reciprocating movement. The legs themselves are set vertically, and consequently, of themselves, cannot give a conveying motion to the box. The material is conveyed along the length of the box by means of differential motion alone, imparted to the box by the head motion mechanism. For the sake of clarity all the joints of the head motion mechanism are shown as open joints, and the weight arm is turned upside down from that shown in Figures 1 to 5 inclusive. By tightening on the handle 28, stress can be put in the extension spring 29, pulling the rocker arm to the right. This in turn would cause the lower end of the rocker arm to move to the left, causing all lost motion in the internal joints of the toggle mechanism to be taken up.

There are spring members 30 at the inlet end of the conveyor. These springs 30 can be stressed by means of the arrangement shown, causing the box to be placed in tension and taking up all lost motion in the link connecting the box with the moving arm. The moving weight of the conveyor trough is counterbalanced by the moving weight attached to the upper end of the arm 31.

Figure 7:
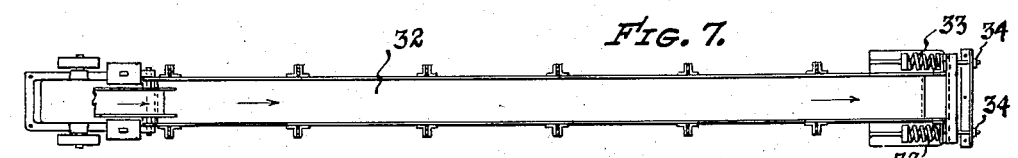
Figure 7 is a diagrammatic illustration of a plan view, parts broken away, of a long conveyor, taken along the line 7—7 of Figure 8.
Figure 8:
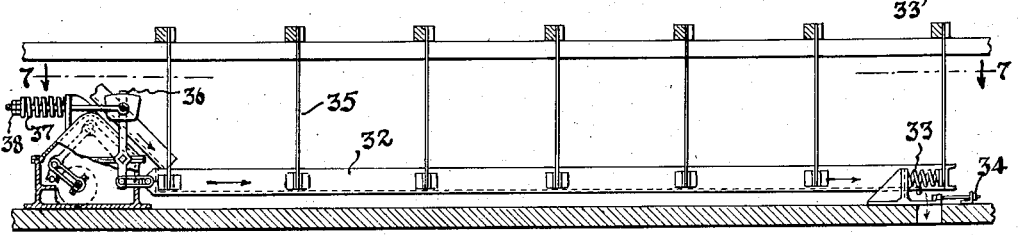
Figure 8 is a diagrammatic illustration of a side elevation of the conveyor shown in Figure 7, parts broken away, employing the principles of the invention.

Figure 7 is a diagrammatic illustration of a plan view, parts broken away, of a conveyor taken along the line 7—7 of Figure 8, showing the box 32 of the conveyor arranged to convey material by means of differential motion. Spring members 33 are arranged each side of the discharge end of the conveyor, and these springs can be stressed by tightening up on the nuts 34, causing the springs to move the box to the right. This will place the box in tension.

Figure 8 is a diagrammatic illustration showing the elevation of Figure 7, and the hanging legs 35 support the box for reciprocating movement. The legs themselves are vertical and hence do not give a conveying motion to the box. It will be seen that when the springs 33 are stressed by tightening up on the nut 34 the box moves to the right, causing all lost motion to be eliminated from the link member connecting the box with the arm 36. The spring member 37 mounted on the head motion lid can be stressed by means of tightening on the nuts 38. This causes the arm to move to the left which in turn moves the rocker arm counter-clockwise, taking up all lost motion in the toggle joints of the differential head motion. It will be understood that as the arm 36 moves to the left all lost motion in the lower link connecting the box 32 with the arm 36 is taken up by means of spring member 33. The moving weight of the box 32 is counterbalanced by the moving weight attached to the arm 36. The springs 40, as illustrated in Figure 10, are shown mounted on the supporting pipe 41 in increasing angularity from the driven end in view of the fact that the particular form of screen illustrated in this figure is adapted for use as a concentrator. However, the springs 40 could be mounted so as to be parallel to each other and to lie either at right angles to the pipe 10 or at an oblique angle with respect thereto. In the former case the machine would be adapted for conveying purposes with all motion parallel to the length of the screen, while in the latter case they would produce a straight line diagonal motion with respect to the length of the table.

Figure 10 is a plan view of the invention applied to a very large size concentrating table. The deck 39 is supported by means of leaf springs 40 on pipe 41. The pipe is journaled in the brackets 42 distributed at intervals throughout the length of the pipe, and pipe 41 terminates at its left end in a bracket in the housing. On each side of the housing 43 of the head motion mechanism there are arranged counterweight arms 44 carrying weights 45. By suitable means attached to the arms carrying these weights are spring members 46 arranged on each side of the housing. By stressing these spring members 46 all lost motion in the toggle joints of the mechanism is taken up.

Figure 12:
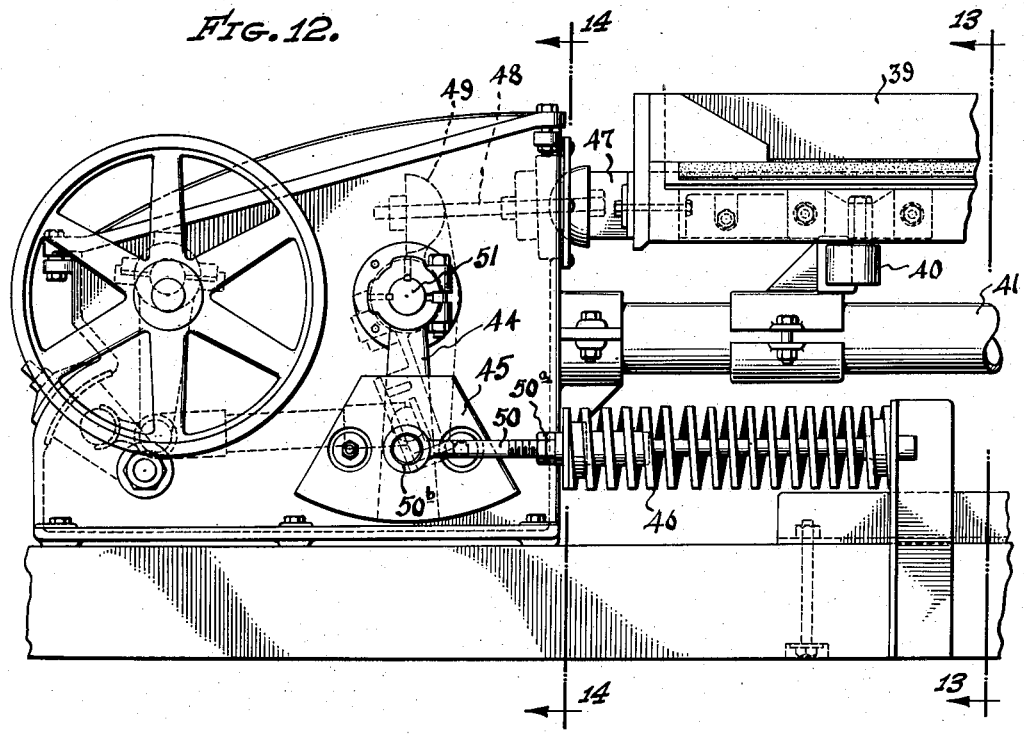
Figure 12 is an enlarged detail, parts broken away, of the concentrating table illustrated in Figures 10 and 11.

The details of the connection between the table deck and the differential motion mechanism, as well as the details of the internal motion of the mechanism, are illustrated with greater clarity in Figure 12, and by using the same numerals that are used in Figures 10 and 11, a more detailed description of the arrangement is possible.

It will be noted that there is attached to the table deck 39 a bracket 47. This bracket carries a spherical shaped seat into which a half ball is fitted. The rod 48 makes the connection between the table deck bracket and the swinging rocker arm 49. It will be clearly noted from Figure 12 that when the nuts 50ª in spring rod 50 are tightened, the spring will push to the left on the bearing 50ᵇ in Figure 12, causing the counterweight arm 44 to move to the left, and since the counterweight arm is attached to a rock shaft 51 which in turn carries the member 49, this obviously will cause the lower end of member 49 to move to the left, causing all lost motion in the toggle joints of the differential motion mechanism to be eliminated. The moving weight of the table deck is counterbalanced by the weight attached to the moving counterweight arm 44. The supporting leaf springs 40 keep the joints tight between the table deck and the rocker arm 49, and the spring members 46 keep the joints tight and all lost motion out of the internal mechanism or toggle joints. Thus the concentrating table will run in perfect balance.

Figure 15 illustrates the invention adapted to run two decks of concentrating tables in opposite directions and to convey material in opposite directions by differential motion from the one head motion. The table decks 52 and 53 are supported on leaf springs 54 and 55. These leaf springs in turn are held in brackets 56 and 57 which fasten to pipes 58 and 59. The pipes are supported by brackets 60 and 61 arranged along the length of the pipes. The one end of pipe 58 terminates in bracket 62 in the housing of the head motion 63. The other end of pipe 59 terminates in bracket 64. The pipes are journaled for rotation in these brackets. Thus when the pipes are caused to have a slight rotation the table is tilted. There is attached to table deck 52 a bracket 65, and a pulling rod 66 suitably connects the table deck through the bracket 65 to a rocker arm 67. Rocker arm 67 is supported on rock shaft 68 and caused to oscillate by the pressure of the toggles in the differential motion mechanism. Table deck 53 carries a bracket 69, and rod 70 joins this bracket to a yoke 71 whose central end terminates in a ball-socket member 72. Each fork of the yoke member 71 passes between the flywheels 73 and 74 and the housing to join the lower end of the swinging arm member 75. Thus it will be seen that when the table deck 52 moves to the right with differential motion, table deck 53 will move to the left with differential motion and material will be conveyed in opposite directions on each deck with the same differential motion. The spring members 54 and 55, of course, take up all lost motion in the internal toggle joints of the mechanism, and spring members 54 and 55 take up all lost motion in the joints joining the table decks with the arms. The moving weight of the table deck 52 is counterbalanced by the moving weight of the table deck 53, and thus concentrating tables of very large sizes and capacity can be built to run in perfect balance using a limited amount of floor space, and both driven from a common head motion, thus saving not only floor space but very much in first cost, while all shock to the building structure is eliminated.

It can be readily understood that not only two concentrating tables, but also two shaking screens or two shaking conveyors, can be driven in the same balanced manner from one head motion as illustrated by the concentrating tables shown in the drawings.

In the structures shown in Figures 1 and 2, it may be noticed that in very short and small machines, although desirable it may not be absolutely necessary to use counterbalance springs, especially if the machine is placed on a solid foundation on a ground floor, as the springs on the reciprocating structure itself can be made large enough to oppose the momentum of the counterbalance also, because all springs are designed to produce pressure in the same direction on the mechanism joints, but then naturally the spring resistance is not balanced each side of the pivot 68. Hence, in large, long structures it becomes more and more imperative to employ separate springs for the reciprocating structure, and for the counterweights; otherwise the great amount of unbalanced spring pressure will shake the building, and also the ball-socket joints at 49 and 47 will be overloaded and run hot.

The applicant has tried out many and various arrangements, and has found that the pressure on the joints at 47 and 49 doubles if springs only on the reciprocating structure are used to oppose momentum of both the structure and the counterweights. It is impractical to run joint 47 in a bath of oil, and if pressure there is doubled, the joint will run hot. Joint 50$^b$ on spring rod 50 does not run in a bath of oil; hence that joint will also run hot if undue spring pressure is applied on it, with corresponding lessening of the spring pressure at the reciprocating structure. Although the momentum of the reciprocating structure and the counterweight, and the respective springs, all act in opposite directions, the spring pressure in both acts to hold the open joints together, because of the pressure acting on the opposite ends of a double ended lever.

The structures shown operate noiselessly and without shock in the building because all the momentum of the reciprocating structure is perfectly counterbalanced on the opposite end of the rocker arm by the equal momentum of the counterweight, and also because the force of the spring pressure opposing the momentum of the reciprocating structure is counterbalanced by substantially equal spring pressure in the opposite direction acting on the counterweight.

In operation, when first starting a machine of this kind, both the springs opposing the reciprocating structure and the counterweights are drawn up tighter than necessary, and the power then turned on. The springs opposing the structure are then eased up on until a slight knock is noticed in the connection to the structure. These springs are then tightened up again until all knock disappears. Then the pressure in the counterweight springs is eased up until a knock appears in that spring rod joint, and possibly also in the toggle mechanism. These springs are then also tightened up until all knock disappears, after which the machine will run night and day without trouble.

In the double structure shown in Figure 17, the tension rods 66 and 70 are also loosened up until a slight knock is observed in both, and then tightened up until all knock disappears in both of these rod connections as well as in the toggle joints in the mechanism.

Figure 9:
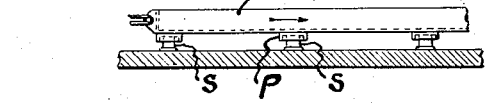
Figure 9 is a diagrammatic illustration, parts broken away, of the reciprocating conveyors, showing a different type of support than is shown in Figures 1 to 8 inclusive, and to which the invention is applicable.

The structure of Figure 9 has been included to bring within the scope of this invention a slide support for the deck or table as distinguished from the flexible supports 3 of Figure 1, 27 of Figure 6, and 35 of Figure 8, and the spring leg supports of the other figures. The subject matter of this invention may equally well be applied to mechanisms of this type where the table T is mounted upon supports S through the intermediate slides or plates P, so that the table T can be given a reciprocatory movement on the slide supports thus provided. In this case, as in the case of the flexible legs, a differential head motion mechanism will be required.

As those skilled in the art will at once appreciate, the subject matter of this invention is adapted to variation without departure from the novel scope therefor, and I do not, therefore, desire to be strictly limited to the disclosure which has been used in an illustrative sense, but rather by the full scope of the claims granted.

In view of the fact that the subject matter of this invention is applicable to concentrating tables, screen and reciprocating conveyors, it is the intention in using the expression "deck member" in the claims, to include all of these as well as equivalent structures.

What is claimed is:

1. In a machine of the type described, a support, a deck member attached to said support so that it may be reciprocated, a drive mechanism positively connected to said deck member for effecting differential reciprocation thereof, a weighted member connected to said drive mechanism to balance the vibratory effects caused by the movement of said deck member, spring means connected between said support and said deck member to hold said deck member in tension, and second spring means connected between said weighted member and said support, said first and second spring means serving to balance the pressure effects caused by the movement of said deck member and to thereby eliminate the vibratory effects resulting from unbalanced pressure.

2. In a machine of the type described, a support, a deck member attached to said support so that it may be reciprocated, a positive drive mechanism connected to said deck member for effecting differential reciprocation thereof, a weighted member connected to said drive mechanism to balance the vibratory effects caused by the movement of said deck member, said weighted member including a second deck member supported for differential reciprocatory movement and positively connected to said drive mechanism, spring means connected between said support and said deck member to hold said deck member in tension, and second spring means connected between said weighted member and said support, said first and second spring means serving to balance the pressure effects caused by the movement of said deck member and to thereby eliminate the vibratory effects resulting from unbalanced pressure.

3. In a machine of the type described, the combination including a deck member, means for supporting said deck member for reciprocatory movement, a positive differential drive mechanism connected to said deck member to reciprocate it, and weighted means connected to said mechanism to balance the vibrations generated by the movement of said deck member.

4. In a machine of the type described, the combination including a deck member, a support, spring legs connecting said deck member to said support and lying in planes inclined to said deck member, a drive mechanism attached to said support and connected to said deck member for imparting differential reciprocatory movement thereto, and weight means connected to said drive mechanism for balancing vibrations produced by the reciprocation of said deck member.

5. In a machine of the type described, the combination including a deck member, a support, spring legs connecting said deck member to said support and lying in planes inclined to said deck member, a positive drive mechanism connected to said deck member for imparting differential reciprocatory movement thereto, weight means connected to said drive mechanism for balancing the moving forces produced by the reciprocation of said deck member, springs connected to said deck member so as to place it in tension, and additional springs connected to said weighted member and exerting their pressure in a direction opposite that of said first mentioned springs as respects said support, said first and second spring means together causing a balancing of the spring pressures and thereby substantially eliminating vibratory effects resulting from unbalanced spring pressures.

6. In a machine of the type described, the combination including a deck member, a support, spring legs connecting said deck member to said support and lying in planes inclined to said deck member, a positive drive mechanism connected to said deck member for imparting differential reciprocatory movement thereto, weight means connected to said drive mechanism for balancing the moving forces produced by the reciprocation of said deck member, and springs connected to said deck member and to said weight means so as to place the deck member in tension and balance said weight means.

7. In a machine of the type described, the combination including a deck member, resilient means for supporting said deck member, a positive driving mechanism connected to said deck member for imparting differential motion thereto and including a pitman and rock shaft, a balancing weight connected to said rock shaft to balance out the moving forces caused by said mechanism as the screen reciprocates, springs engaging said deck member to place it in tension against said drive mechanism, and springs engaging said balancing weight and exerting their pressure in a direction opposite to said tensioning springs as respects the base, said first and second springs being balanced to thereby eliminate vibratory effects on said base resulting from the unbalanced spring pressures.

8. In a machine of the type described, the combination including a deck member, means for resiliently supporting said deck member, a differential motion driving mechanism comprising a linkage system made up of open ended links connected to said deck member, springs engaging said deck member to hold said links in tight engagement with their cooperating members, a weighted element connected to said linkage system to balance the vibrations caused by the movement of said deck, and springs connected to said weight element said last mentioned springs and said first mentioned springs being balanced and exerting their pressures in opposite directions as respects the support for said deck member, whereby vibratory effects due to unbalanced spring pressures are eliminated.

9. In a machine of the type described, the combination comprising a base member, a deck member, a plurality of resilient supports for mounting the deck member on said base member, and a differential drive mechanism connected to said deck member comprising a rock shaft, means for positively connecting the rock shaft to the deck member, a toggle mechanism connected to said rock shaft, a pitman connected to said toggle mechanism, a weighted arm connected to said rock shaft, and a compression spring connected to said arm.

10. In the combination of claim 9, said resilient supports lying transversely of the longitudinal axis of said deck member.

11. In a mechanism of the type described, the combination comprising a base member, a pair of deck members, spring arms for resiliently supporting said deck members on said base member in end to end relation, and driving mechanism for imparting positive differential motion to said deck members comprising a rock shaft, means for positively connecting each of said deck members to said rock shaft, a toggle mechanism connected to said rock shaft, a pitman connected to said toggle mechanism, said means for connecting the deck members to said rock shaft holding said spring arms under stress.

12. In the combination of claim 11, said toggle mechanism comprising open ended members held together by the stress in said spring arms.

13. In the combination of claim 11, said deck members being arranged substantially in the same horizontal plane.

14. In a machine of the type described, a combination comprising a base member, a deck member, a drive mechanism for imparting differential movement to said deck member, means comprising a plurality of resilient arms to support said deck member from said base member and to tension said deck member against said driving means, said driving means comprising a rock shaft connected to said deck, weight means connected to said rock shaft to counterbalance the moving deck, and spring means interposed between said base and said weight means to counterbalance the spring pressure of said resilient supports, whereby vibratory effects resulting from unbalanced weight are eliminated by said weight means and vibratory effects resulting from unbalanced pressure are eliminated by the balancing of the pressure of said springs.

15. In a machine of the type described, a combination comprising a base member, a deck member, a drive mechanism for imparting differential movement to said deck member, means comprising a plurality of resilient arms to support said deck member from said base member and to tension said deck member against said driving means, said driving means comprising a rock shaft connected to said deck, weight means connected to said rock shaft to counterbalance the moving deck, said weight means including a second deck resiliently supported for drive by said rock shaft, and spring means interposed between said base and said weight means to counterbalance the spring pressure of said resilient supports, said spring means including the pressure exerted by the resilient supports of said second deck, whereby vibratory effects resulting from unbalanced weight are eliminated by said weight means and vibratory effects resulting from unbalanced pressure are eliminated by the balancing of the pressure of said resilient supports for said two deck members.

GUSTAVE A. OVERSTROM.